(12) United States Patent
Higgins

(10) Patent No.: US 6,456,940 B1
(45) Date of Patent: *Sep. 24, 2002

(54) MINIMUM SAFE ALTITUDE SYSTEM AND METHOD

(75) Inventor: Terry T. Higgins, Nitro, WV (US)

(73) Assignee: AMSAAD, Inc., Warminster, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,288

(22) Filed: Nov. 19, 1999

Related U.S. Application Data

(60) Provisional application No. 60/109,182, filed on Nov. 20, 1998.

(51) Int. Cl.[7] .................................................. G08G 5/04
(52) U.S. Cl. ........................................ 701/301; 701/14
(58) Field of Search ................................ 701/301, 213, 701/120, 14, 16

(56) References Cited

U.S. PATENT DOCUMENTS

| | | | |
|---|---|---|---|
| 4,224,669 A | * | 9/1980 | Brame ............................ 701/8 |
| 5,414,631 A | * | 5/1995 | Denoize et al. .............. 701/301 |
| 5,488,563 A | | 1/1996 | Chazelle et al. |
| 5,596,500 A | | 1/1997 | Sprague et al. |
| 5,608,392 A | * | 3/1997 | Faivre et al. ................ 340/967 |
| 5,801,659 A | | 9/1998 | Helfrick |
| 5,826,834 A | | 10/1998 | Potter et al. |
| 5,839,080 A | | 11/1998 | Muller et al. |
| 5,864,307 A | | 1/1999 | Henley |
| 5,884,222 A | | 3/1999 | Denoize et al. |
| 5,892,462 A | | 4/1999 | Tran |
| 5,907,568 A | | 5/1999 | Reitan, Jr. |
| 5,936,552 A | | 8/1999 | Wichgers et al. |

FOREIGN PATENT DOCUMENTS

DE 430561 A1 * 8/1994

* cited by examiner

*Primary Examiner*—Michael J. Zanelli
*Assistant Examiner*—Eric M Gibson
(74) *Attorney, Agent, or Firm*—Evelyn H. McConathy; Dilworth Paxson LLP

(57) ABSTRACT

The invention provides an aircraft navigation system and method of aiding aerial navigation, comprising a global positioning receiver adapted to provide real time longitude, latitude, altitude, heading, velocity, and time data; a minimum safe altitude database for a collection of cells, wherein each cell represents a geographic area of the earth; an alphanumeric display; and a processor adapted to calculate the minimum safe altitude within a cell corresponding to the real time latitude and longitude of the aircraft and one or more adjacent cells, wherein the processor is connected to and controls the display to indicate the current and projected numeric minimum safe altitude.

15 Claims, 6 Drawing Sheets

MINIMUM SAFE ALTITUDE SYSTEM AND METHOD

CROSS-REFERENCE TO RELATED APPLICATIONS

This application claims priority to U.S. Provisional Application No. 60/109,182 filed on Nov. 20, 1998.

BACKGROUND OF THE INVENTION

This invention relates to aircraft navigation systems and methods.

In recent years, ground proximity warning systems (GPWS) have been developed and installed in all commercial aircraft. GPWS were designed to assist pilots in preventing controlled flight into terrain (CFIT), the cause of a large proportion of fatal aircraft accidents. Various problems exist with state of the art GPWS systems, including giving the warning too late for the pilot to recover, ignoring GPWS warnings because of disbelief on the part of pilots, and inability to climb over terrain in time to avoid CFIT when the terrain is rising too steeply.

Various attempts have been made to provide a temporary local map based on a terrestrial database combined with the aircraft's longitude and latitude information, but such systems are too complex for the majority of pilots, and do not provide the most pertinent information, i.e., current, real time minimum safe altitude and projected minimum safe altitude. Furthermore, such systems provide the terrestrial information combined in a display with much other information, including, for example, weather information, which can be confusing to pilots who are accustomed to navigation based on minimum safe altitude data.

Currently there is no available source of minimum safe altitude data correlated to geographic information in electronic form. Use of lap books containing minimum safe altitude for a collection of cells, each cell representing a geographic area of the earth, is still the state of the art in aerial navigation. Such lap books must be updated periodically, and current U.S. regulations require updating every 56 days in order to provide pilots with the most current information. In view of the problems caused by the use of lap books, it has been proposed to add MSA data to enroute, terminal, and approach charts, which would require the pilot to constantly monitor the chart by cross checking the aircraft's position while trying to complete flight duties. Additionally the pilot would have to interpret the relative position of the aircraft and determine if the aircraft would be entering a higher MSA.

In addition, in the United States but not in most other countries, air traffic computers have been designed to help air traffic controllers (ATC) monitor each aircraft's altitude with regard to the minimum safe altitude (MSA) and to provide the ATC with an aural or visual warning, in which case the controller is supposed to give a verbal warning to the pilot to check the aircraft's altitude. These systems are called minimum safe altitude warning systems (MINSAW). The MINSAW system depends on the ATC to immediately warn the pilot, and depends on the pilot being on a designated frequency; as a result, frequently the pilot is not warned in sufficient time to take appropriate corrective action.

Because of these problems with the state of the art, it is the objective of the present invention to provide a system and method for displaying the real time MSA of an aircraft based on its geographical position. A further object is to provide a system and method of displaying projected MSA.

BRIEF SUMMARY OF THE INVENTION

These objects, and others which will become apparent in view of the following description, are achieved by the present invention which, in one aspect, comprises an navigation system comprising a global positioning receiver adapted to provide real time longitude, latitude, altitude, heading, velocity, and time data; a minimum safe altitude database for a collection of cells, each cell representing a geographic area of the earth; an alphanumeric display; and a processor adapted to calculate the minimum safe altitude for a cell corresponding to the real time latitude and longitude of the aircraft and one or more adjacent cells and controlling the display to indicate the real time numeric minimum safe altitude.

In another aspect, the invention comprises a method of aiding aerial navigation comprising: providing a database of minimum safe altitudes for a collection of cells, each cell representing a geographic area of the earth; providing an aircraft with a global positioning receiver; providing an alphanumeric display in the cockpit of the aircraft; using the real time longitude, latitude, altitude, heading, velocity, and time data from the global positioning receiver and the minimum safe altitude data from the database to calculate and display in numeric form on the alphanumeric display the real time minimum safe altitude.

Preferably the processor controls the display to indicate the projected MSA, which is generally accomplished by use of MSA information in cells in the database which are adjacent to the cell in which the aircraft is currently flying. The exact position, heading, velocity, and time data received from the global positioning system receiver is used to determine the location of the plane and the expected location.

The database preferably comprises airport approach data, including glidepath altitude, so that when the processor calculates that the aircraft is approaching an airport, it determines whether the approach is normal or not, and if normal, the MSA for the glidepath only is displayed. If the system determines that the landing approach is aborted, it displays the real time MSA and the MSA of the area beyond the airport, i.e., the projected position, when appropriate.

The MSA database is preferably updated periodically, for example every 56 days as required under current U.S. regulations.

An alarm is also preferably provided and the processor is adapted to cause the aural alarm to sound if the aircraft falls a certain distance, e.g., 200 feet, below the MSA, based on the global positioning data received from the global positioning system (GPS). An advantage of the present system is that the display in such case can also indicate the actual MSA for the cell into which the aircraft is travelling, so that the pilot can know exactly which altitude must be achieved in a climb.

DETAILED DESCRIPTION OF THE INVENTION

Figure 1:
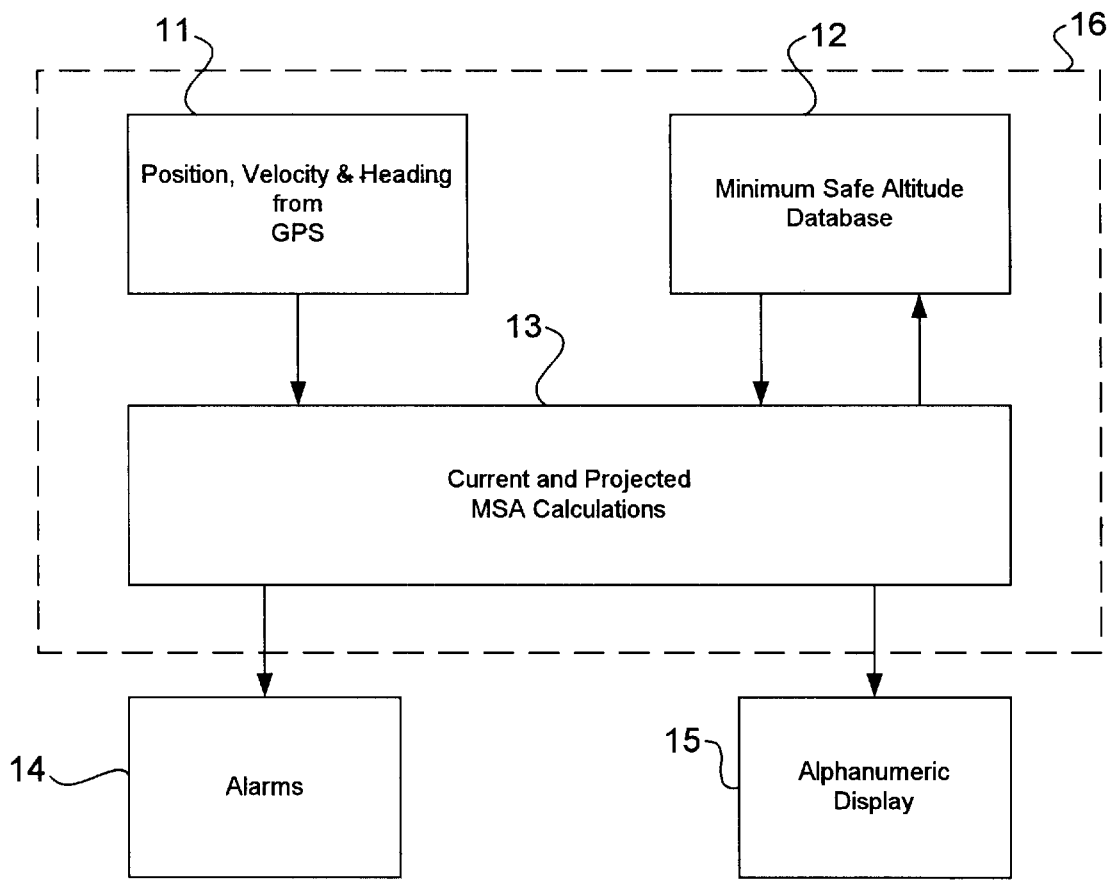
FIG. 1 is a schematic diagram of the system of the invention.
Figure 5:
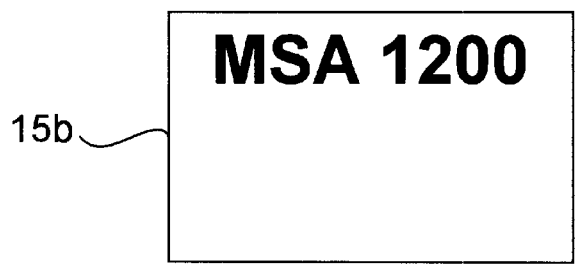
FIG. 5 is an embodiment of a display mode according to the invention which may be displayed during takeoff mode while aircraft is in airport area. Preferably the display has green text on a black background.
Figure 6:
FIG. 6 is an embodiment of a display mode according to the invention which may be displayed in flight mode when aircraft is within 200 feet of minimum safe altitude and has left airport area. Preferably the text is green on a black background.

Referring first to FIG. 1, GPS data 11 is received by a processor 16, into which has been stored a minimum safe altitude (MSA) database 12. Examples of suitable GPS systems are the Ashtech G-8 model and the PCM-3290A 12-channel GPS engine, both of which include antennas. The processor is programmed to calculate 13 current MSA for the real time position of the aircraft, and projected MSA, using algorithms which take into consideration the current position, the projected position, and the MSA for the projected position. Examples of a suitable processors are the Intel Pentium and the AMPRO CM2-486-K-74 CoreModule/486-II, 8M RAM. In situations where the projected MSA is higher than the current altitude, the system preferably is designed to display on an alphanumeric display 15 the projected MSA and to sound an audio alarm, using an alarm device 14, if the projected flight path must be altered to avoid CFIT. The system is preferably designed to display on the alphanumeric display the numerical MSA 15b when the aircraft is in a takeoff mode (FIG. 5) and preferably a message such as "Condition Safe" and the current MSA as illustrated at 15c (FIG. 6) when the aircraft is in the air after takeoff. An example of a suitable display is the Varitronix CCSTN-12864 Color LCD Display with CCFL backlighting.

Figure 2:
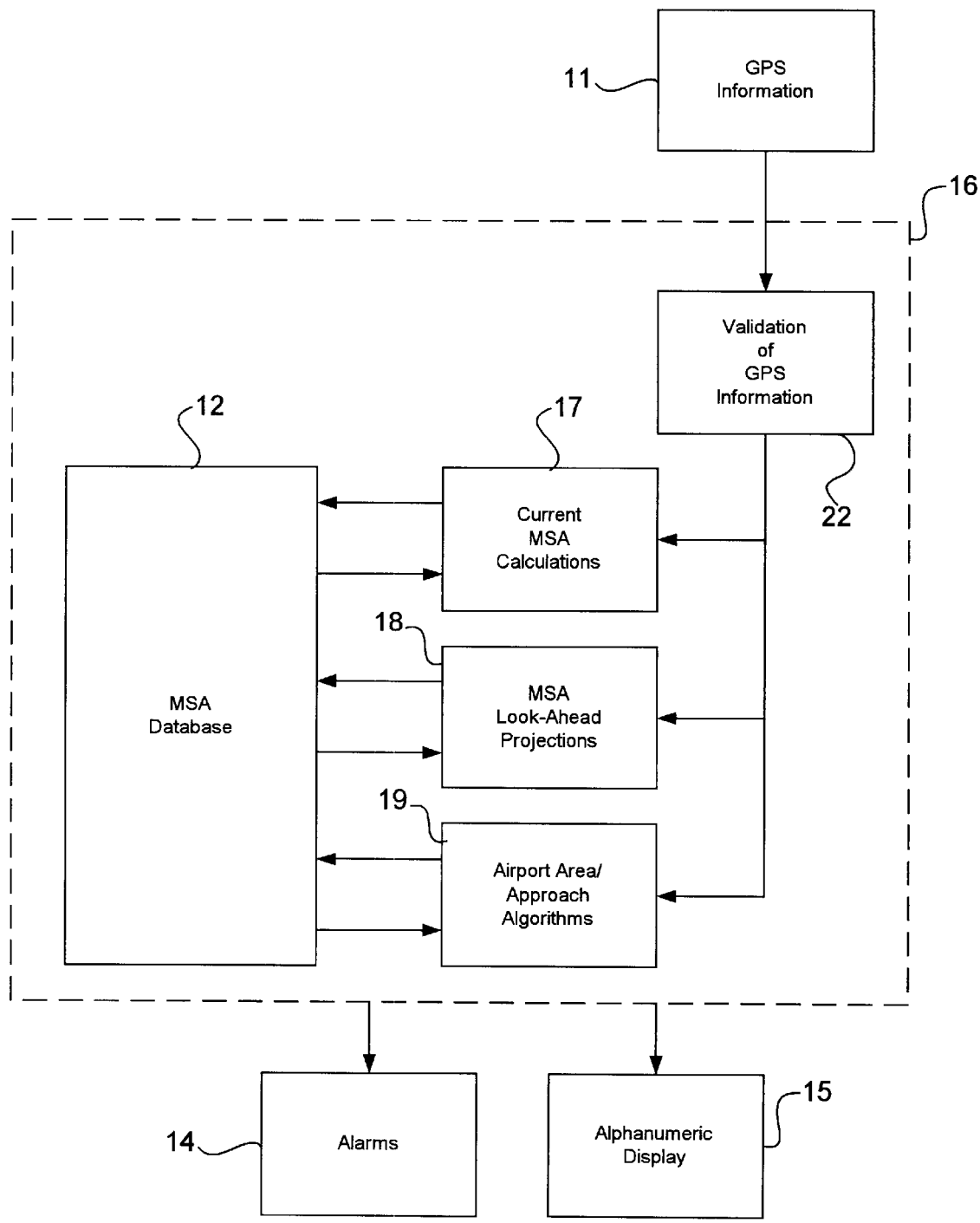
FIG. 2 is a schematic diagram of a preferred embodiment of the system of the invention.
Figure 9:
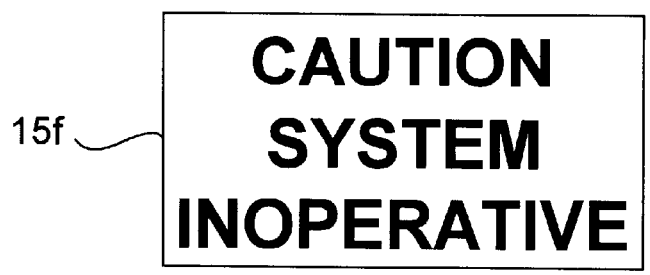
FIG. 9 is an embodiment of a display mode according to the invention which may be displayed in flight mode when the system is inoperative or has a malfunction, for example if the GPS data cannot be validated. Preferably the text is yellow on a black background, indicating system operation suspended.

Referring to FIG. 2, GPS information 11 is preferably first validated 22 by the processor 16 using the software of the invention. If the data is not valid, the system displays an indication such as "No GPS Data" 15f (FIG. 9) or a flashing "CAUTION SYSTEM INOPERATIVE" in yellow letters on a black background on the alphanumeric display. The "CAUTION SYSTEM INOPERATIVE" text is also preferably displayed if there are reasons other than invalid GPS data for the system being inoperative. If the current GPS data is valid, current MSA is calculated 17, look ahead projections are calculated 18, and the system determines 19 whether or not the aircraft is approaching an airport. Each of these calculations is carried out by the processor 16 and requires use of the MSA database 12 which is stored in system memory. The processor 16 controls the alarms 14 and alphanumeric display 15.

The MSA database 12 must be provided to the aircraft on board system and updated when appropriate to assure that changes in MSA for various areas are included. In the U.S., the MSA logbooks must be updated every 56 days, and therefore the electronic version must also be updated on the same schedule. An electronic version of the MSA's for various geographic areas is not currently available, and so an MSA database must be created for use in this invention. The database can be created by using the MSA-cell information which is currently available in lap book format.

Figure 3:
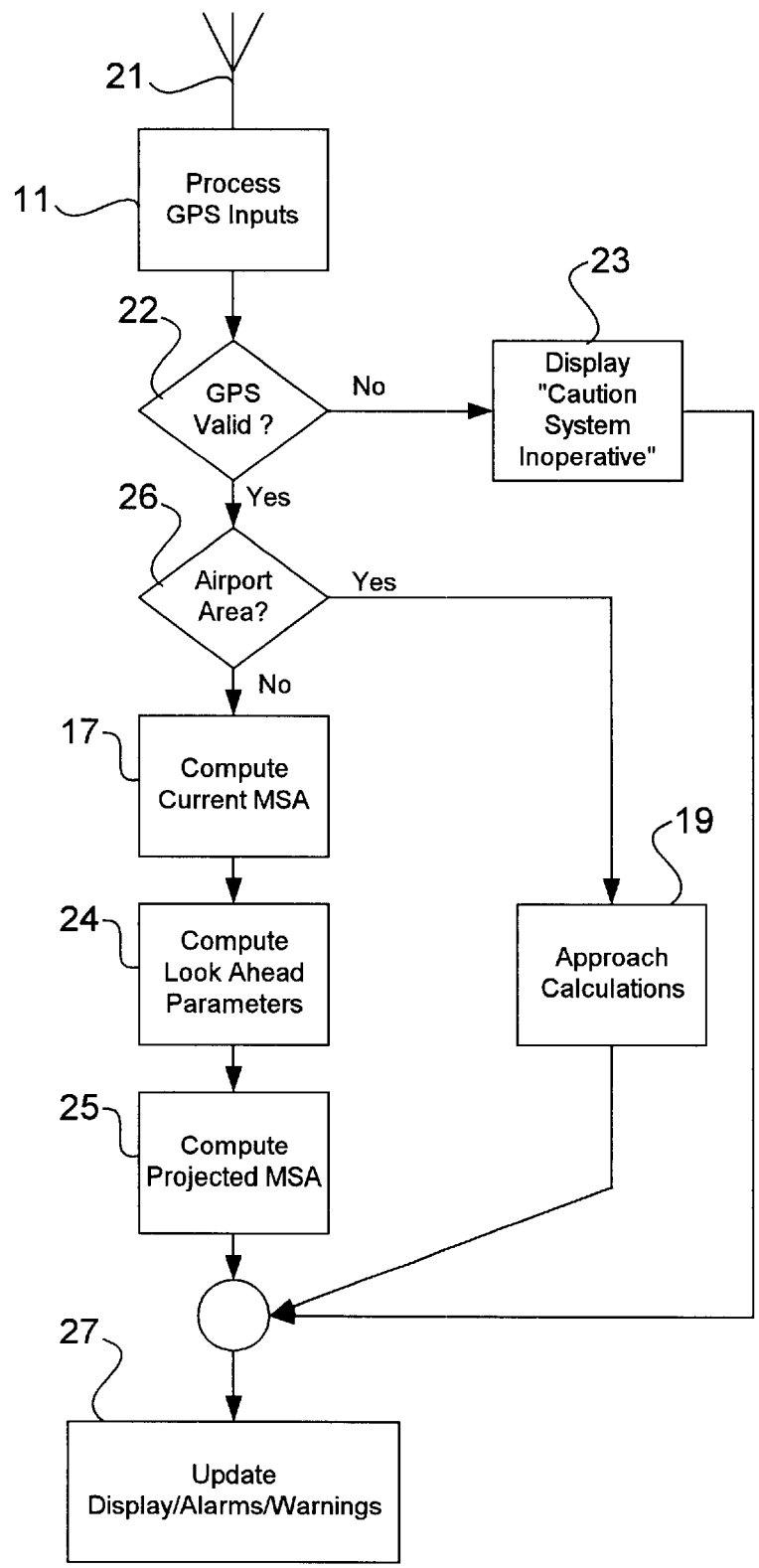
FIG. 3 is a schematic diagram of another preferred embodiment of the invention.
Figure 10:
FIG. 10 is an embodiment of a display mode according to the invention which may be displayed when the aircraft is at Final Approach Fix for landing. Preferably the text is green on a black background.
Figure 11:
FIG. 11 is an embodiment of a display mode according to the invention which may be displayed when aircraft is below correct glideslope during its approach. Preferably the text is red on a black background.

Referring now to FIG. 3, an antenna 21 is used by the GPS 11 to receive GPS information from the current satellite network. GPS systems are in wide use, and the current invention contemplates using the currently available GPS and any improvements which may be made to GPS in the future. At times the GPS does not provide valid data, and a conventional validation system 22 is used to check for the validity and either pass the data through to the MSA computation function 17 of the processor, or to cause the alphanumeric display to a message such as No GPS Data If to indicate that the system is not functioning. The processor also computes look ahead parameters 24, projected MSA 25, and whether 26 the aircraft is in an airport area. If the aircraft is approaching an aircraft area, approach calculations are performed 19, and the system then indicates 27 the display whether the aircraft is on 15g (FIG. 10) or off 15h (FIG. 11) a published glidepath. If the landing approach is aborted, the system can determine such condition from the GPS data and can then revert to normal MSA processing wherein both the current cell and the projected cell MSA's are calculated and indicated 27 on the alphanumeric display. For example, if a higher MSA is projected in the next cell, the text illustrated at 15d in FIG. 7 would be displayed. If, on the other hand, there are higher elevations in the current cell, a warning such as at 15e in FIG. 8 may be displayed. The warning 15e may be flashed on and off in ½ second intervals on the display, combined with an aural warning. Preferably, these warnings may be manually cancelled by the pilot by pressing a cancel button (not shown) on the display or until the aircraft climbs above a prefixed distance, e.g., 200 feet, below the MSA.

Figure 7:
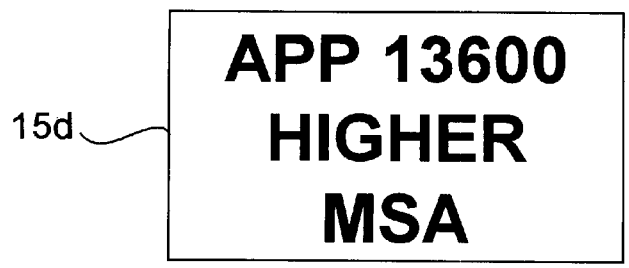
FIG. 7 is an embodiment of a display mode according to the invention which may be displayed in flight mode when the aircraft which is flying in a path which is approaching an area of higher minimum safe altitude. Preferably the text is yellow on a black background.
Figure 8:
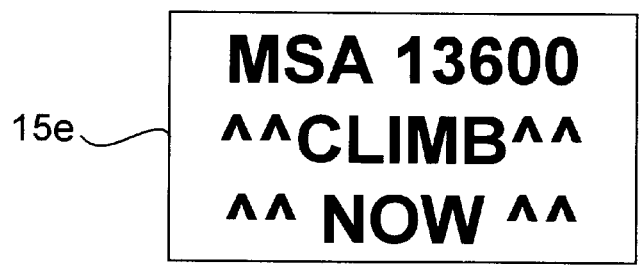
FIG. 8 is an embodiment of a display mode according to the invention which may be displayed in flight mode when an aircraft is flying a path which is determined by the system to be more than a fixed distance, e.g., 200 feet, below the minimum safe altitude and therefore the system displays this alphanumeric warning. Preferably the text is red on a black background.

During normal flight, if a higher MSA is projected in the next cell, the text illustrated at 15d in FIG. 7 would be displayed. If, on the other hand, there are higher elevations in the current cell, a critical warning such as at 15e in FIG. 8 may be displayed. The warning 15e may be flashed on and off in ½ second intervals on the display, combined with an aural warning. Preferably, these critical warnings may be manually cancelled by the pilot by pressing a cancel button (not shown) on the display or until the aircraft climbs above a prefixed distance, e.g., 200 feet, below the MSA.

Figure 4:
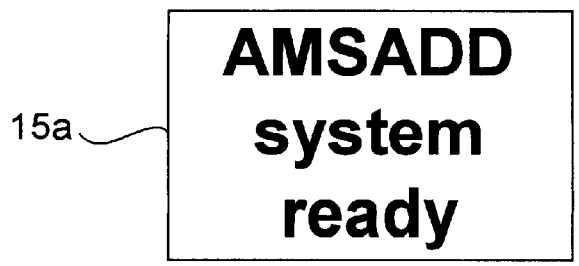
FIG. 4 is an embodiment of a display mode according to the invention wherein the system is ready, and preferably has blue text on a black background.
Figure 12:
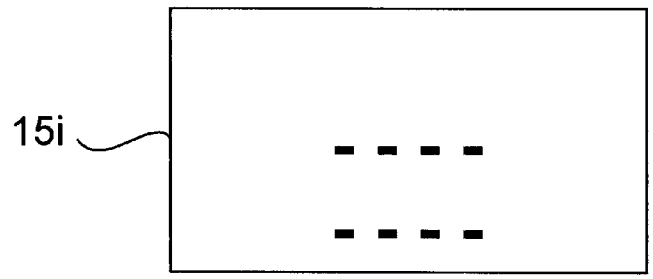
FIG. 12 is an embodiment of a display mode according to the invention which may be displayed when the aircraft is on a runway. Preferably the text is blue on a black background.

A special feature of the invention is to blank the screen as illustrated in FIG. 12 when the aircraft has landed and is on the runway. FIG. 4 is an example of how the display may look when the system is idle or ready, for example in the airport runway prior to takeoff.

Preferably the alphanumeric text of the display change color, depending on the system condition message being displayed. For example alphanumeric text in green represents a safe condition, yellow is warning or caution (e.g., approaching a higher MSA) and red indicates that you are in a danger condition (e.g., climb now). Blue indicates an idle condition with the system operation suspended. For example, the first system ready display is blue. The text showing condition safe is green. The first airport area display is green but the one that says check altitude is yellow.

While this invention and the preferred embodiments have been described herein in detail, various modifications, alternatives, and improvements should become apparent to those skilled in the art without departing from the spirit and scope of the invention.

What is claimed is:

1. An aircraft navigation system operating independently of all other aircraft systems comprising:
    an aircraft data source consisting of a global positioning receiver adapted to provide real time longitude, latitude, altitude, heading, velocity, and time data;
    a minimum safe altitude database for a collection of cells, wherein each cell represents a geographic area of the earth, and wherein the database is updated at least every 56 days;
    an alphanumeric display; and
    a processor adapted to calculate the minimum safe altitude within a cell corresponding to the real time latitude and longitude of the aircraft and one or more adjacent cells, wherein the processor is connected to and controls the display to indicate the real time numeric minimum safe altitude.

2. System according to claim 1, wherein the processor further controls the display. to indicate current and projected minimum safe altitude.

3. System according to claim 1, wherein the database comprises airport approach data comprising glidepath data.

4. System according to claim 3, wherein the processor calculates whether the aircraft is in a landing approach and whether the landing approach is a normal or an aborted approach and, if normal, controls the display to indicate minimum safe altitude following the glidepath only.

5. System according to claim 4, wherein the processor is adapted to determine whether the aircraft is within an airport area and if so, to determine whether the aircraft is on a glidepath.

6. System according to claim 4, wherein if the approach is aborted, the real time and projected minimum safe altitude are calculated.

7. System according to claim 1, further comprising an alarm, wherein the processor is adapted to cause the alarm to sound if the global positioning system data indicates that the aircraft is at an altitude which is a fixed distance below the minimum safe altitude.

8. System according to claim 1, wherein the database comprises airport approach data comprising glidepath altitude, and wherein the system further comprises an alarm; and wherein the processor is adapted to cause the alarm to sound if the aircraft is approaching an airport and is not within a glidepath.

9. System according to claim 1, wherein the processor is adapted to determine if valid real time data is being received from the global positioning receiver, and if valid data is not being received, to cause the display to so indicate.

10. Method of aiding aerial navigation comprising:
    providing a database of minimum safe altitudes for a collection of cells, wherein each cell represents a geographic area of the earth, and wherein the database is updated at least every 56 days;
    providing an aircraft with a global positioning receiver as the sole source of data for calculating aircraft position using real time longitude, latitude, altitude, heading, velocity, and time data;
    providing an alphanumeric display; and
    using the data from the global positioning receiver and the minimum safe altitude data from the database to calculate and display in numeric form on the alphanumeric display the real time minimum safe altitude.

11. Method of claim 10, further comprising calculating projected minimum safe altitude and displaying the projected minimum safe altitude when the projected minimum safe altitude is higher than the current minimum safe altitude.

12. Method of claim 10, further comprising validating the real time global positioning data, and if the real time data is not valid, indicating such condition on the display.

13. Method of claim 10, wherein the data includes airport approach data comprising glidepath data, and wherein the processor determines whether the aircraft is in a landing approach and whether the landing approach is a normal approach or an aborted approach and, if normal, displaying minimum safe altitude following the glidepath only.

14. Method of claim 13, wherein if the approach is aborted, the projected minimum safe altitude is displayed.

15. Method of claim 10, further comprising providing an alarm and causing the alarm to sound if the aircraft is flying at a fixed distance below the minimum safe altitude.

* * * * *

UNITED STATES PATENT AND TRADEMARK OFFICE
CERTIFICATE OF CORRECTION

PATENT NO. : 6,456,940 B1
DATED : September 24, 2002
INVENTOR(S) : Terry Higgins et al.

It is certified that error appears in the above-identified patent and that said Letters Patent is hereby corrected as shown below:

<u>Title page,</u>
Item [75], Inventor, add -- Alan D. Fesnak, Lansdale, PA (US) --.

Signed and Sealed this

Eighteenth Day of February, 2003

JAMES E. ROGAN
*Director of the United States Patent and Trademark Office*